(12) United States Patent
Newton

(10) Patent No.: US 6,212,226 B1
(45) Date of Patent: Apr. 3, 2001

(54) SUPPLEMENTAL POWER FOR BATTERY OPERATED MODEMS

(75) Inventor: Kenneth Alan Newton, Whitehall, PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 08/907,456

(22) Filed: Aug. 8, 1997

(51) Int. Cl.[7] .................................. H04B 1/38; H04L 5/16

(52) U.S. Cl. ............................. 375/222; 379/413

(58) Field of Search ........................... 375/222; 455/377; 379/457, 21, 394, 398, 400, 404

(56) References Cited

U.S. PATENT DOCUMENTS

| | | |
|---|---|---|
| 4,373,117 | 2/1983 | Pierce. |
| 4,415,774 | 11/1983 | Driver. |
| 4,417,099 | 11/1983 | Pierce. |
| 4,578,533 | 3/1986 | Pierce. |
| 4,691,344 | 9/1987 | Brown et al.. |
| 4,803,719 | 2/1989 | Ulrich. |
| 5,086,454 | 2/1992 | Hirzel. |
| 5,461,671 | * 10/1995 | Sakuragi et al. ............ 379/400 |
| 5,613,229 | * 3/1997 | Baranowski et al. ........ 455/127 |

\* cited by examiner

Primary Examiner—Chi Pham
Assistant Examiner—Phuong Phu
(74) Attorney, Agent, or Firm—William H. Bollman

(57) ABSTRACT

The modem of a portable computer device draws a portion of its required power from the telephone line using a low noise switching power supply. The switching power supply can alternatively or additionally assist in keeping the battery of the portable computer device charged. The generation or propagation of electrical noise on the input telephone line is minimized by actively maintaining a constant input impedance from the telephone line to the modem. In one embodiment, a switchable shunt impedance is placed in parallel with the input to a PWM switching power supply and actively controlled to maintain the impedance of the input of the PWM switching power supply constant to the extent that a constant current draw is maintained. Thus, the net input impedance of the modem as sensed by the telephone line is stable and balanced despite the chopping of the current on the telephone line due to the switching of the PWM switching power supply, thus minimizing or eliminating the generation of electrical noise back to the telephone line. In another embodiment, a constant current regulator is placed in series with a PWM switching power supply to maintain a constant input impedance to the modem as sensed by the telephone line.

26 Claims, 5 Drawing Sheets

SUPPLEMENTAL POWER FOR BATTERY OPERATED MODEMS

BACKGROUND OF THE INVENTION

1. Field of the Invention

This invention relates to the supplemental use of a switching power supply to draw power from a telephone line to assist a battery with powering the modem of a portable computer device. More particularly, this invention relates to a low noise constant input impedance switching power supply for drawing power from the input telephone line.

2. Background of Related Art

Many portable computer devices utilize modems for communications purposes. However, battery size and weight is an important consideration in the design and convenience of such devices. A balance must be reached between the size and weight of the overall device, dictated largely by the choice of battery, and an acceptable length of operation between charges.

Unfortunately, although operating an acceptable length of time when running typical application programs, portable computer devices utilize a large amount of power when communicating over a telephone line via a modem. The battery source which powers both the portable computer device and its modem is typically sized for general computing applications, and runs out of power quickly when actively communicating over a telephone line through a modem. Portable computer devices such as personal digital assistants (PDAs), hand held PCs (HPC), PCMCIA modems, and portable data terminals are designed to operate up to several hours on a single battery charge, but operate only fractions of an hour on a single battery charge when communicating via modem. Thus, although portable computer devices operate a sufficient length of time for quick data transfers over a modem powered completely by a battery, they require that external AC power be applied to allow for longer uses of the modem. It is therefore desirable for battery powered computer devices including a modem to draw power, in addition to the inherent battery, from a second power source.

The DC power inherent in a telephone line provides a convenient source of power, but there are often limitations and restrictions which limit the ability of a modem to derive power from the telephone line. For instance, present regulation in the United States is such that significant current may only be drawn from the telephone line when the telephone or modem is off hook or active. In order to hold the telephone line in an off hook condition, current in the approximate range of 20 mA to 150 mA must be drawn. The maximum amount of current available from the telephone line is also limited.

Modems which are designed to be powered entirely from the telephone line are known, but these designs suffer from an extremely constrained power budget. Moreover, modems are also subject to government constraints, e.g., FCC Part 68 requirements for telephones in the U.S., and limitations on effects and noise which may be placed back on the telephone line, placing further restrictions on the use of power from the telephone line.

Other conventional modems have inefficient power conversion apparatus making inefficient use of power from the telephone line.

In general, switching power supplies have previously been considered unsuitable for deriving power from the telephone lines because of the substantial amount of electrical noise inherent in such technology. A substantial amount of filtering is conventionally required to remove the noise generated back on the input lines, but this filtering would itself require a significant amount of power and thus degrade the net amount of power available from the telephone line. Switching power supplies are therefore conventionally avoided in the design of modems for computer devices not only because of the need for filtering but because of the additional stringent government standards as to the allowable maximum amount of disturbance of a telephone line due to a modem connection.

SUMMARY OF THE INVENTION

The present invention provides a modem for a portable computer device which draws only a portion of its required power from the telephone line using a low-noise switching power supply, which also can assist in keeping the battery for the portable computer device charged.

Switching power supplies are relatively inexpensive, utilize few components, and are relatively efficient. However, a major drawback preventing their widespread use in powering portable computer devices from a telephone line heretofore has been that because of the switching regulation of the output, they exhibit a high level of electrical noise to the input.

When a switching power supply is used to draw power from a telephone line, the input current is conventionally chopped, causing undesirable noise on the input telephone line, and jeopardizing compliance of the modem with required standards such as FCC Part 68 requirements in the United States.

According to one embodiment of the present invention, a shunt impedance placed in parallel with the input to a PWM switching power supply is switched in and out of the circuit to maintain the impedance of the input constant to the extent that a constant current draw is maintained. Thus, the impedance of the modem as sensed by the telephone line is balanced and constant despite the chopping of the current on the telephone line due to the switching of the power supply. Accordingly, the net input impedance is constant over time and electrical noise on the telephone line due to the modem is minimized or eliminated.

According to another embodiment, a constant current regulator is placed in series with the PWM switching power supply to maintain a constant impedance to the telephone line.

It is therefore an object of the invention to provide a portable computer device which operates longer between charges by utilizing available power from the telephone line.

It is also an object to provide a modem which utilizes available power from the telephone line efficiently and without causing significant electrical noise to the telephone line.

It is an additional object to provide a battery powered modem which utilizes power from a telephone line to trickle-charge the battery power source of the battery powered modem.

These and other objects, features and advantages of the present invention will become apparent to those skilled in the art from the following description with reference to the drawings.

BRIEF DESCRIPTION OF THE DRAWINGS

The invention will be described with reference to the drawings, in which.

DETAILED DESCRIPTION OF ILLUSTRATIVE EMBODIMENTS

Figure 1:
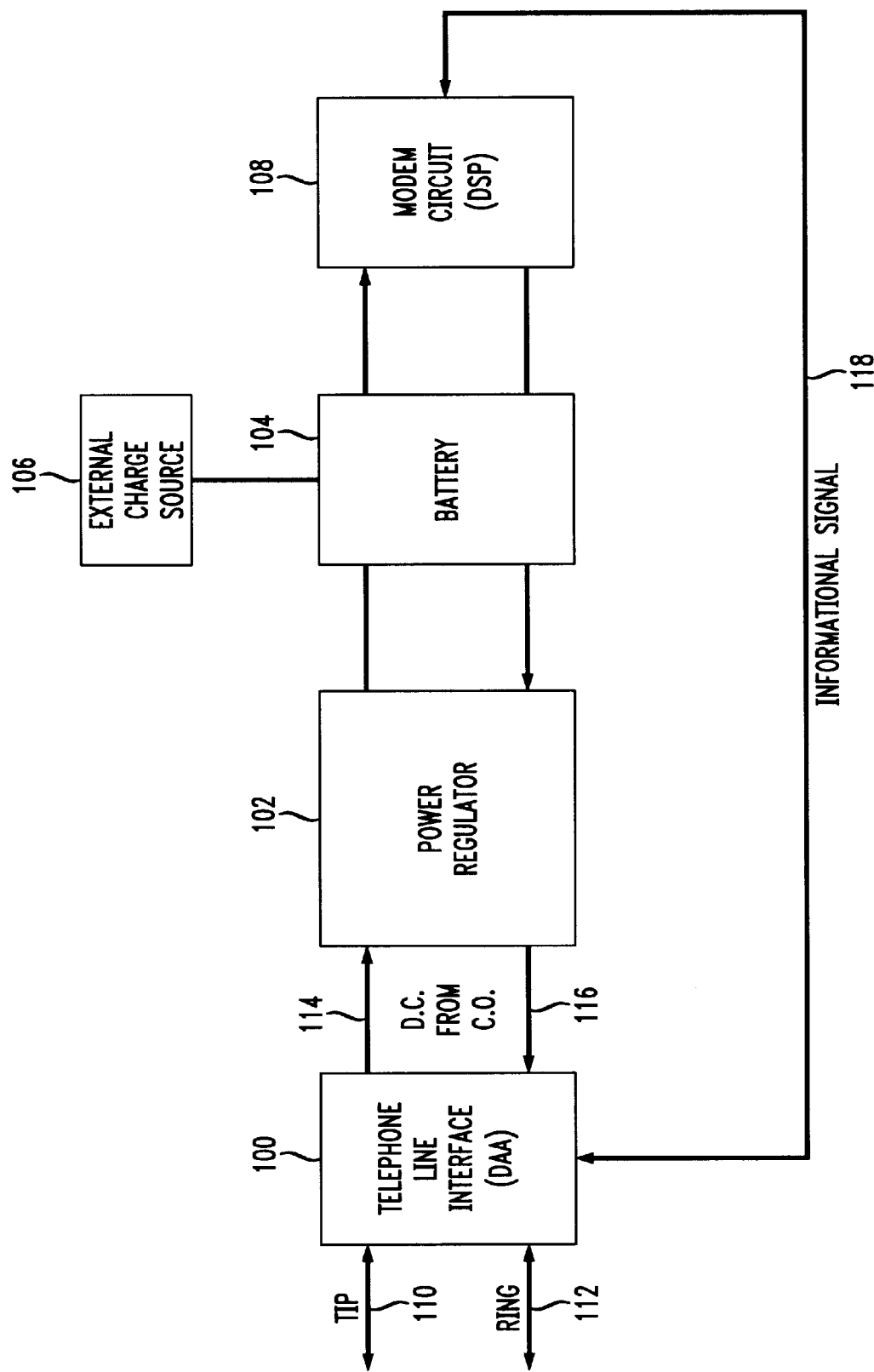
FIG. 1 shows a block diagram of the telephone interface and power supply of a battery operated modem according to the present invention.

FIG. 1 is a block diagram of a battery powered modem according to the present invention.

A standard two-wire telephone line 110, 112 from a central telephone office is connected to a standard telephone line connector such as an RJ-11 or other common telephone connector (not shown) on the portable computer device. The signal from the telephone line 110, 112 includes both an ac signal component and a dc power component and is input to the tip and ring inputs of a telephone line interface 100 of the modem.

The telephone line interface 100 in the exemplary embodiment is a data access arrangement (DAA) available from LUCENT TECHNOLOGIES. The DAA 100 includes transformers which provide isolation and balance while minimizing signal distortion within communications networks. The DAA 100 provides a barrier preventing electrical contact between the modem and the central telephone equipment. Located close to the phone jack, the transformers in the DAA 100 function as an isolation barrier that withstands high voltages between telephone lines, the rest of the modem circuitry, and the user. The telephone line interface 100 may alternatively be any SLIC chip or telephone interface accepting a common two or four-wire telephone input for a central telephone office.

The telephone line interface 100 extracts both an information signal 118 and a direct current (dc) voltage from the telephone line 110, 112. The dc voltage component on telephone line 110, 112 is nominally 48 volts dc from the central telephone office, and is extracted from the telephone line 110, 112 by the telephone line interface 100 and output on power lines 114, 116.

Although under present U.S. regulations the dc voltage can be made available for use by a modem on a telephone line essentially only when the modem is in the off hook state, the present invention is equally applicable to drawing power from the telephone line in either the off hook or on hook state. Thus, although the exemplary embodiments of the present invention comply with present U.S. regulations in drawing power from the telephone line only when the modem is in the off hook state, the invention can also be implemented to draw power from the telephone line in both the off hook and on hook states of the modem.

A power regulator 102 such as a switching regulator or linear regulator converts the dc voltage output from the telephone line interface 100 into a lower voltage, higher current dc voltage. The lower voltage, higher current dc voltage can be added to the power output from a battery 104 to power the portable computer device. The output voltage of power regulator 102 may be 5 volts, 3.3 volts, 2.5 volts, or any other common power voltage useful for powering circuitry and/or line drivers of a modem. The lower voltage, higher current dc voltage can either be added to the output power of battery 104, or it can be used to trickle-charge the battery 104, or both. Moreover, the lower voltage, higher current can be used to power only a specific component of the modem circuit 108, e.g., telephone line interface 100.

In the exemplary embodiment, the battery 104 is charged by the power drawn from the telephone line only when the modem is off hook. When the modem is on hook, the battery 104 is charged entirely by an external charge source 106.

The output of the battery 104, the output of the power regulator 102, and/or the excess power available from the external charge source 106 when plugged into the portable computer device combine and assist each other to provide the dc power to the modem circuit 108 and telephone line interface 100 necessary for operation.

The information signal 118 from the telephone line interface 100 is input to the modem circuit 108, which in the exemplary embodiment comprises a digital signal processor (DSP). The information signal 118 may include typical telephone quality voice, modulated data, or other standard analog or digital signals conventionally transmitted over a telephone line.

Figure 2:
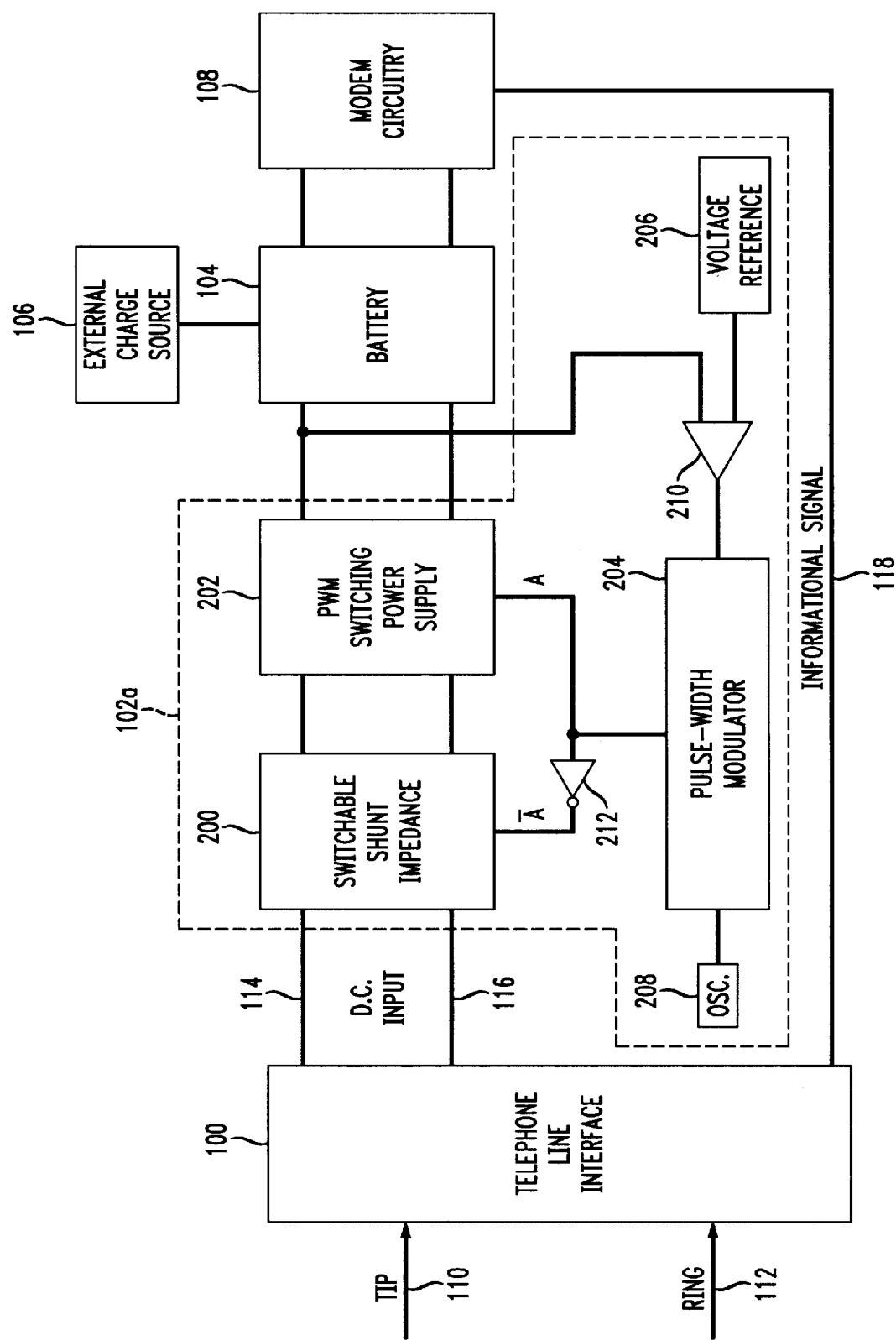
FIG. 2 shows a block diagram of a first embodiment of the present invention utilizing a shunt impedance in parallel with the input to a PWM switching power supply.

FIG. 2 is a detailed block diagram of an exemplary embodiment of the present invention. The telephone line interface 100, telephone line 110, 112, power lines 114, 116, external charge source 106, battery 104, modem circuitry 108, and information signal 118 are as discussed above with respect to FIG. 1. In this embodiment, the power regulator 102 comprises a pulse-width modulated (PWM) switching power supply with a shunt impedance which is switched in and out of the circuit.

Regulation of the output of the PWM switching power supply 202 is accomplished by a feedback loop comprising an error amplifier or comparator 210 which compares the voltage output from the PWM switching power supply 202 to a voltage reference 206. The voltage reference 206 outputs a voltage at the desired regulated level, e.g., 5 volts, 3.3. volts, or 2.5 volts.

A pulse-width modulator 204 supplies a PWM switching power supply 202 with a PWM clock signal 'A' in which the duty cycle is varied in response to the changing output dc level as determined by error amplifier or comparator 210. PWM clock signal 'A' is a square wave of variable duty cycle. If the output of the comparator 210 indicates that the voltage output from the PWM switching power supply 202 is low, the positive pulse of PWM clock signal 'A' is widened. Conversely, if the output voltage is high, the positive pulse of PWM clock signal 'A' is narrowed. Inverter 212 provides an inverted PWM clock signal '/A' for controlling the switchable shunt impedance 200.

Oscillator 208 provides an oscillation frequency for pulse-width modulator 204. The frequency of oscillator 208 is chosen to correspond to the chosen values of components in the PWM switching power supply 202, e.g., the value of the capacitor and inductor. Typically, the frequency of oscillator 208 is chosen to be greater than audible frequencies, i.e., approximately 20 KHz and greater.

The switchable shunt impedance 200 is placed in parallel with dc voltage power lines 114, 116 output from the telephone line interface 100, and controllably switched in and out of the circuit by the inverted PWM dock signal '/A'.

Figure 3A:
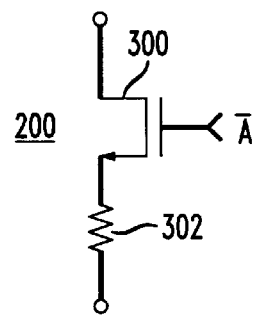
FIGS. 3A and 3B are circuit diagrams of exemplary embodiments of the shunt impedance shown in FIG. 2.
Figure 3B:
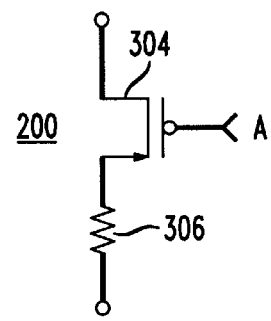

FIGS. 3A and 3B are circuit diagrams of exemplary embodiments of the switchable shunt impedance 200. FIG. 3A shows a resistance or impedance 302 which is switched in and out of the circuit by an NMOS field effect transistor (FET) 300 in correspondence with the positive pulses of the inverted PWM clock signal '/A'. The resistance or impedance 302 in the exemplary embodiment is a resistor having a resistance approximately equal to the series resistance of the PWM switching power supply 202 and its load. Alternatively, a PMOS FET 304 together with resistance or impedance 306 can form the switchable shunt impedance 200 as shown in an alternative embodiment shown in FIG. 3B. The switchable shunt impedance 200 is switched into the circuit on negative pulses of PWM clock signal 'A' to shunt the PWM switching power supply 202 during the time when the PWM switching power supply 202 is not charging its output charge capacitor.

Although field effect transistors (FETs) were used in the exemplary embodiments, any suitable semiconductor switch can be used, e.g., to switch the shunt resistance or impedance 302, 306 into and out of the circuit. Moreover, the particular semiconductor switch or FET used in the switchable shunt impedance 200 need not be the same component used in the PWM switching power supply 202 or other elements of the portable modem device.

The switchable shunt impedance 200 provides a path for a shunt resistance which minimizes load fluctuation presented to the telephone line 110, 112 arising from the switching of the series-pass FET in the PWM switching power supply. Therefore, noise generated into the telephone line from current chopping by the PWM switching power supply 202 is minimized. The PWM switching power supply 202 and switchable shunt impedance 200 provide the required load to the telephone line 110, 112 when the modem is in the off hook state, and maintains a high impedance condition when the modem is in the on hook state, in accordance with present FCC Part 68 regulations in the United States.

Figure 4:
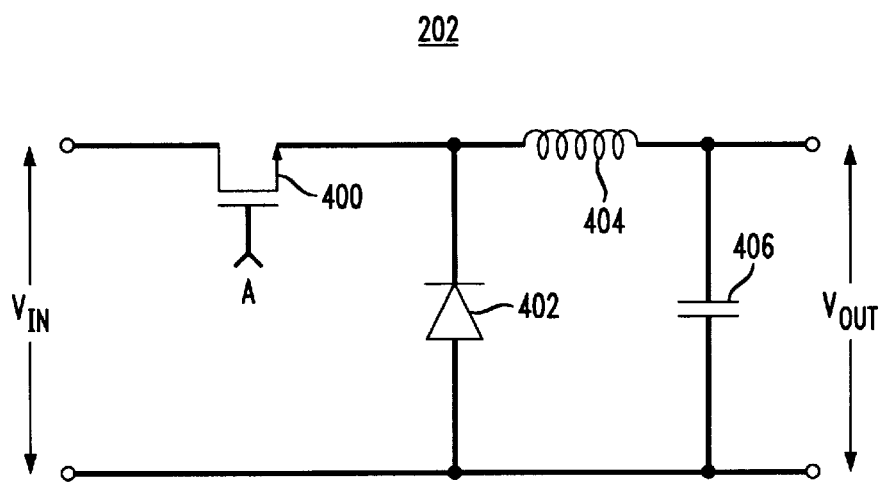
FIG. 4 is a circuit diagram of an exemplary embodiment of the PWM switching power supply shown in FIG. 2.

FIG. 4 is a circuit diagram of an example PWM switching power supply 202. The switching power supply has often been thought of as an on-off device that controls the average direct current passing through it with duty-cycle or pulse-width modulation. The PWM switching power supply 202 shown in FIG. 4 is a step-down circuit wherein the output voltage is always less than the input voltage.

The PWM switching power supply 202 comprises semiconductor switch 400, inductor 404, charge capacitor 406, and shunt voltage regulator 402. Reversing the inductor 404 with the diode 402 and inverting the polarity of the capacitor 406 would provide a polarity reversing circuit wherein the output voltage can be greater or less than the input voltage.

The semiconductor switch 400 is an NMOS FET driven by PWM clock signal 'A' in the exemplary embodiment. The shunt voltage regulator 402 used in the present exemplary embodiment is a free-wheeling diode.

In operation, pulse-width modulator 204 outputs a square wave PWM clock signal 'A', which switches semiconductor switch 400 closed (or on) and open (or off). When the semiconductor switch 400 is driven closed (i.e., FET 400 on) by a positive pulse of PWM clock signal 'A', the power output from the telephone line interface 100 on power lines 114, 116 charges the charge capacitor 406. Conversely, when PWM clock signal 'A' switches semiconductor switch 400 open (i.e., FET 400 off), inductor 404 maintains a charge on charge capacitor 406.

The inductor 404, charge capacitor 406 and shunt voltage regulator 402 are conventional devices selected according to design parameters shown in Table I. Vout is in volts, C is in microfarads, L is in henries, and Ipk is the peak inductor current in amperes. Table I relates only to the exemplary embodiment of FIG. 4.

TABLE I

| Design Parameter | General Equation |
|---|---|
| $V_{out}$ | $\dfrac{(L)(I_{pk})}{t_{off}} - V_D$ |
| $I_{pk}$ | $2(I_{out})\dfrac{(V_{out} + V_D - V_T)}{V_{IN} - V_T}$ |
| $t_{off}$ | $\dfrac{(L)(I_{pk})}{V_{out} + V_D}$ |
| $\dfrac{t_{on}}{t_{off}}$ | $\dfrac{V_{out} + V_D}{V_{IN} - V_T - V_{out}}$ |
| f | $\dfrac{1}{t_{OFF} + t_{ON}}$ |
| L | $\dfrac{V_{out} + V_D}{I_{pk}}(t_{off})$ |
| C | $\dfrac{(I_{pk})(1/f)}{(8)(V_{RIPPLE})}$ |
| Efficiency | $\dfrac{V_{IN} + V_D - V_T}{V_{IN}} \times \dfrac{V_{out}}{V_{out} + V_D}$ |

Figure 5:
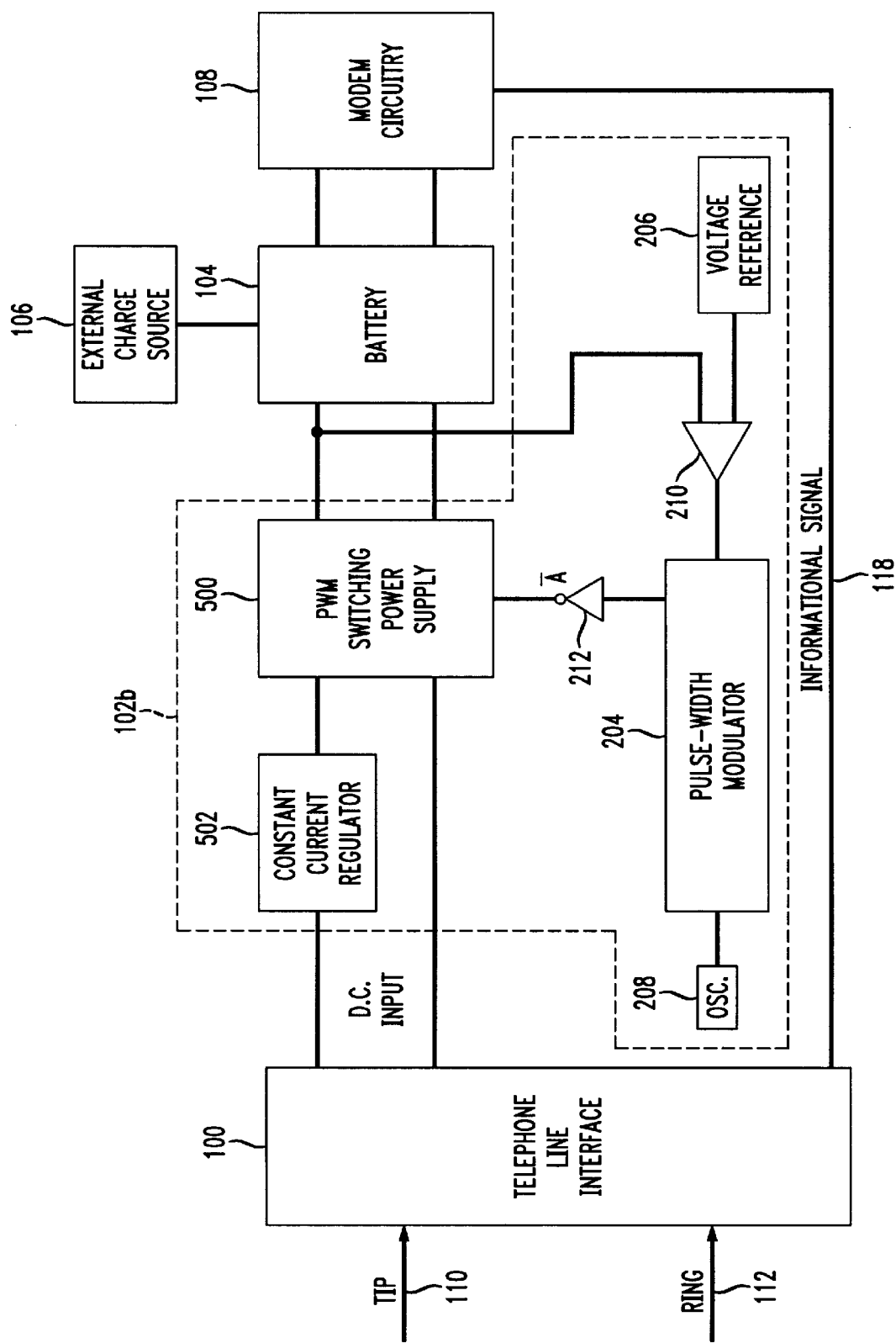
FIG. 5 shows a block diagram of a second embodiment of the present invention utilizing a constant current regulator in series with a PWM switching power supply.
Figure 6:
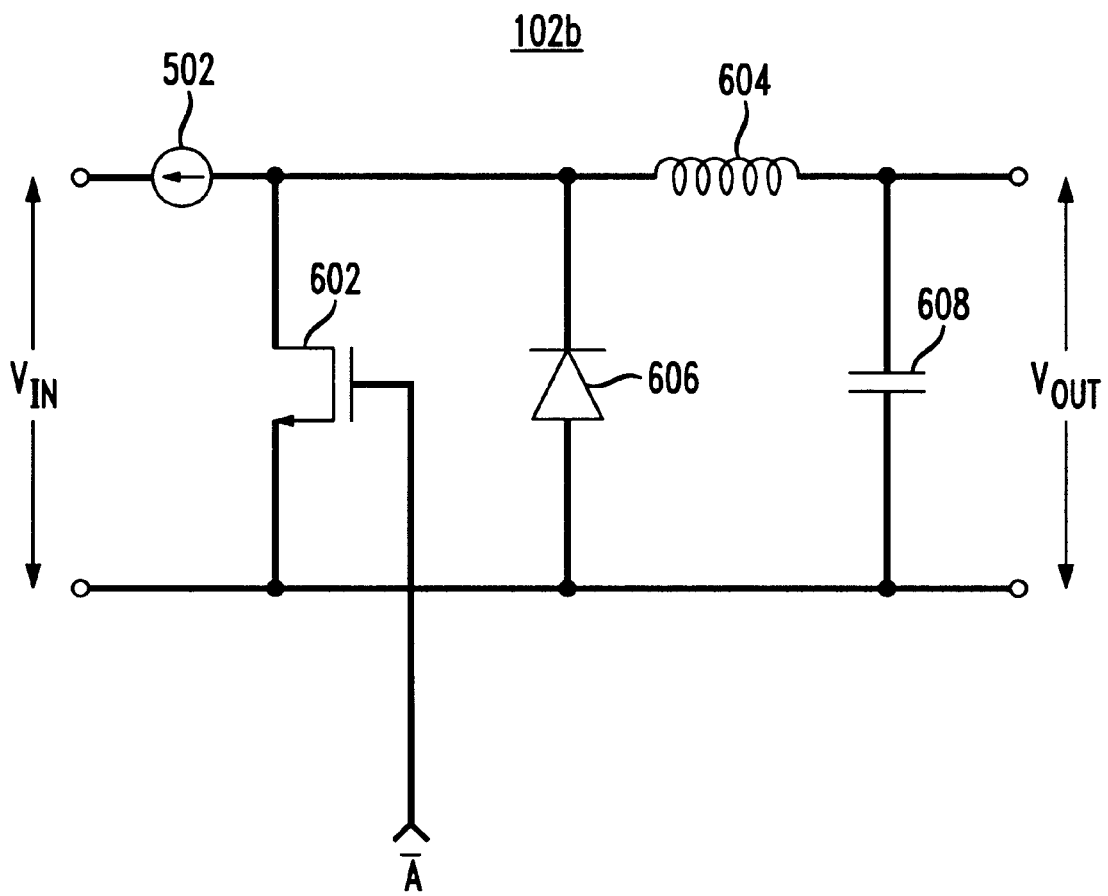
FIG. 6 is an exemplary circuit diagram of the constant current regulator and PWM switching power supply shown in FIG. 5.

FIG. 5 shows a second exemplary embodiment of the present invention. The telephone line interface 100, telephone lines 110, 112, external charge source 106, battery 104, modem circuitry 108, pulse-width modulator 204, error amplifier 210, voltage reference 206, oscillator 208 and information signal 118 are as described above. The second exemplary embodiment utilizes a constant current regulator 502 together with a PWM switching power supply 500 rather than a switchable shunt impedance 200 as in the first embodiment shown in FIG. 2. The constant current regulator 502 and PWM switching power supply 500 are shown in more detail in FIG. 6.

A constant current regulator 502 is placed in series with a PWM switching power supply 500 to regulate the current drawn by the PWM switching power supply 500. Constant current regulator 502, e.g., a diode, lowers its impedance to maintain a constant current flow, and thus presents a nearly constant load to the telephone line dc source, thus generating very little noise back into the telephone line 110, 112. The value of the current regulation is chosen to allow sufficient charge of charging capacitor 608 when the semiconductor switch 602 is off, and to provide suitable loading to the telephone line 110, 112 in conformance with telephone standards.

A shunt semiconductor switch 602 is placed in parallel with the input to the PWM switching power supply 500 after the current regulator 502. The semiconductor switch 602 may be an NMOS FET as in the present exemplary embodiment. The semiconductor switch 602 is controlled by an inversion of the PWM clock signal 'A', i.e., by inverted PWM clock signal '/A' output from pulse-width modulator 204.

The remainder of the PWM switching power supply 500 comprises inductor 604, voltage regulator 606, and charge capacitor 608. The voltage regulator 606 in the exemplary embodiment is a Zener diode.

During operation, when the shunt FET 602 is switched off by the negative pulses of PWM clock signal 'A', charge capacitor 608 is charged at the rate allowed by current regulator 502. When the shunt FET 602 is switched on by the positive pulses of PWM clock signal 'A', a virtual short circuit occurs in parallel with the diode 606 and in parallel with the inductor 604/charge capacitor 608 series connection, and constant current regulator 502 regulates and maintains a constant current draw to the telephone central office via the telephone line.

While the invention has been described with reference to the exemplary preferred embodiments thereof, those skilled in the art will be able to make various modifications to the described embodiments of the invention without departing from the true spirit and scope of the invention.

I claim:

1. A battery operated modem comprising:
   a battery powered modem circuitry;
   a switching power supply adapted to receive input power from a telephone line and adapted to output a dc power voltage to said battery powered modem circuitry; and
   a shunt impedance between an input to said switching power supply and said telephone line, said shunt impedance being adapted to switch in and out in correspondence with a switching control signal of said switching power supply to shunt said switching power supply.

2. The battery operated modem according to claim 1, further comprising:
   a telephone line interface between said battery powered modem circuitry and said telephone line.

3. A battery operated modem comprising:
   a modem circuitry;
   a pulse-width modulator;
   a pulse-width modulated switching power supply controllable by an output of said pulse-width modulator, said pulse-width modulated switching power supply adapted to receive input power from a telephone line and adapted to output a dc power voltage to said modem circuitry; and
   a shunt impedance between an input to said pulse-width modulated switching power supply and said telephone line, said shunt impedance being adapted to switch in and out in correspondence with said output of said pulse-width modulator to shunt said switching power supply.

4. The battery operated modem according to claim 3, further comprising:
   a telephone line interface between said modem circuitry and said telephone line.

5. The battery operated modem according to claim 3, wherein:
   said shunt impedance is adapted to switch out when said pulse-width modulated switching power supply is charging a charge capacitor with said output dc power voltage from said telephone line.

6. The battery operated modem according to claim 3, further comprising:
   a battery;
   wherein said dc power voltage output from said pulse-width modulated switching power supply is adapted to trickle-charge said battery.

7. The battery operated modem according to claim 3, wherein said shunt impedance comprises a series connection of:
   a semiconductor switch; and
   a resistor.

8. The battery operated modem according to claim 7, wherein said semiconductor switch comprises:
   a field effect transistor.

9. A modem device comprising:
   a modem circuitry;
   a pulse-width modulator;
   a pulse-width modulated switching power supply controllable by an output of said pulse-width modulator, said pulse-width modulated switching power supply adapted to receive input power from a telephone line and adapted to output a dc power voltage to said modem circuitry; and
   a constant current regulator between said pulse-width modulated power supply and said input power from said telephone line, said constant current regulator being adapted to limit a maximum current drawn from said telephone line by said pulse-width modulated switching power supply.

10. The modem device according to claim 9, further comprising:
    a telephone line interface between said modem circuitry and said telephone line.

11. The modem device according to claim 9, further comprising:
    a battery;
    wherein said dc power voltage output from said pulse-width modulated switching power supply is adapted to trickle-charge said battery.

12. The modem device according to claim 9, wherein said constant current regulator comprises:
    a diode.

13. The modem device according to claim 9, wherein said pulse-width modulated switching power supply includes:
    a shunt semiconductor switch in parallel with an input to said pulse-width modulated switching power supply.

14. The modem device according to claim 13, wherein said semiconductor switch comprises:
    a field effect transistor.

15. A method of providing supplemental power to a battery operated modem, comprising:
    providing a modem to interface with a telephone line;
    powering said modem from a battery source;
    supplementally powering said modem with dc power extracted from said telephone line by a switching power supply; and
    switching a shunt impedance in and out of a circuit between an input to said switching power supply and said telephone line;
    wherein input impedance fluctuations of said switching power supply are minimized.

16. The method of providing supplemental power to said battery operated modem according to claim 15, further comprising:
    switching said shunt impedance in and out of said circuit in correspondence with an output of a pulse-width modulator associated with said switching power supply.

17. The method of providing supplemental power to said battery operated modem according to claim 15, further comprising:
    charging said battery source with said dc power extracted from said telephone line.

18. The method of providing supplemental power to said battery operated modem according to claim 15, further comprising:

switching said shunt impedance in and out of said circuit with a semiconductor switch.

19. The method of providing supplemental power to said battery operated modem according to claim 15, further comprising:

switching said shunt impedance in and out of said circuit with a field effect transistor.

20. A method of providing supplemental power to a battery operated modem, comprising:

providing a modem to interface with a telephone line;

powering said modem from a battery source;

supplementally powering said modem with dc power extracted from said telephone line by a switching power supply;

switching a shunt impedance in and out of a circuit between an input to said switching power supply and said telephone line;

wherein input impedance fluctuations of said switching power supply are minimized; and matching an impedance value of said shunt impedance to an average input impedance of said switching power supply measured during charging of a capacitor of said switching power supply from said telephone line.

21. A method of providing supplemental power to a battery operated modem, comprising:

providing a modem to interface with a telephone line;

powering said modem from a battery source;

supplementally powering said modem with dc power extracted from said telephone line by a pulse-width modulated switching power supply; and limiting a maximum amount of dc current drawn from said telephone line with a current regulator;

wherein input impedance fluctuations of said switching power supply are minimized.

22. The method of providing supplemental power to said battery operated modem according to claim 21, further comprising:

charging said battery source with said dc power extracted from said telephone line.

23. The method of providing supplemental power to said battery operated modem according to claim 21, further comprising:

switching said switching power supply with a semiconductor switch shunting an input to said switching power supply.

24. The method of providing supplemental power to said battery operated modem according to claim 21, further comprising:

switching said switching power supply with a field effect transistor shunting an input to said switching power supply.

25. A modem device comprising:

modem means for generating an information signal for transmission over a telephone line;

switching power supply means for dc-to-dc converting input power drawn from a telephone line into a lower voltage, higher current dc power to power said modem means; and shunt impedance means between an input to said switching power supply means and telephone line, said shunt impedance means being switched in and out in correspondence with an output of a switching control signal of said switching power supply means to shunt said switching power supply.

26. The modem device according to claim 25, further comprising:

interface means for interfacing said modem means to said telephone line.

* * * * *